(12) United States Patent
DeMasi, Sr.

(10) Patent No.: US 8,007,337 B1
(45) Date of Patent: Aug. 30, 2011

(54) UNIVERSAL FLYING HAWK

(76) Inventor: Douglas D. DeMasi, Sr., Hopewell Junction, NY (US)

( * ) Notice: Subject to any disclaimer, the term of this patent is extended or adjusted under 35 U.S.C. 154(b) by 2172 days.

(21) Appl. No.: 09/845,999

(22) Filed: Sep. 24, 2001

Related U.S. Application Data

(63) Continuation-in-part of application No. 09/313,566, filed on May 14, 1999, now abandoned.

(51) Int. Cl.
*A63H 27/00* (2006.01)
(52) U.S. Cl. ............... 446/61; 446/65; 446/79; 244/4 A; 244/16
(58) Field of Classification Search .............. 446/61, 446/62, 66–68; 441/65, 79; 280/14.27, 14.28; 244/4 A, 5, 16, 120
See application file for complete search history.

(56) References Cited

U.S. PATENT DOCUMENTS

| | | | | |
|---|---|---|---|---|
| 1,099,575 A * | 6/1914 | Skaszynski | ...................... | 441/65 |
| 1,222,114 A * | 4/1917 | McCarty et al. | ............... | 114/315 |
| 1,325,137 A * | 12/1919 | Brooke | ........................ | 244/35 R |
| 2,108,652 A * | 2/1938 | Coanda | ........................ | 244/73 B |
| 2,841,406 A * | 7/1958 | Brandon | ..................... | 280/28.15 |
| 3,200,421 A * | 8/1965 | Williams | ........................ | 441/65 |
| 3,320,625 A * | 5/1967 | Schlueter | ........................ | 441/65 |
| 3,409,920 A * | 11/1968 | Brownley | ........................ | 441/74 |
| 3,491,997 A * | 1/1970 | Winters | ........................ | 472/129 |
| 3,650,234 A * | 3/1972 | Goudy | ........................... | 114/315 |
| 3,703,265 A * | 11/1972 | Troitino | ......................... | 244/13 |
| 3,747,138 A * | 7/1973 | Morgan | ......................... | 441/74 |
| 3,996,868 A * | 12/1976 | Schagen | ..................... | 114/39.14 |
| D247,924 S * | 5/1978 | Yamanaka | ................... | D21/769 |
| 4,149,483 A * | 4/1979 | Scott, Jr. | ...................... | 114/332 |
| 4,388,777 A * | 6/1983 | Hermann et al. | ............... | 446/61 |
| 4,439,165 A * | 3/1984 | Rothstein | ......................... | 441/74 |
| 4,530,511 A * | 7/1985 | Brandt, III | ..................... | 280/603 |
| 4,720,280 A * | 1/1988 | Hufnagl et al. | ................. | 441/74 |
| 4,898,345 A * | 2/1990 | Clayton | ........................ | 244/4 A |
| 5,083,955 A * | 1/1992 | Echols | ............................ | 441/65 |
| 5,100,354 A * | 3/1992 | Woolley et al. | ................. | 441/65 |
| 5,122,085 A * | 6/1992 | Heath | ............................ | 441/65 |
| 5,152,705 A * | 10/1992 | Rock | ................................ | 441/65 |
| 5,249,998 A * | 10/1993 | Woolley et al. | ................. | 441/65 |
| 5,389,023 A * | 2/1995 | McIntyre | ......................... | 441/65 |
| 5,482,485 A * | 1/1996 | Ball | ................................ | 441/65 |
| 5,498,184 A * | 3/1996 | Saghri | ............................ | 441/65 |
| 5,957,742 A * | 9/1999 | Brennan et al. | ................. | 441/79 |
| 6,234,856 B1 * | 5/2001 | Woolley | ......................... | 441/65 |
| 6,443,786 B2 * | 9/2002 | Woolley | ......................... | 441/65 |
| 6,443,787 B2 * | 9/2002 | Woolley | ......................... | 441/65 |
| 2003/0197090 A1 * | 10/2003 | Klima | ............................ | 244/4 A |

FOREIGN PATENT DOCUMENTS

| | | | |
|---|---|---|---|
| DE | 4332216 A1 * | 6/1994 | |
| FR | 2576867 A * | 8/1986 | |

* cited by examiner

*Primary Examiner* — Bena Miller
(74) *Attorney, Agent, or Firm* — Joseph B. Taphorn

(57) ABSTRACT

A multi-use recreational product fully assembled constitutes a toy that can be towed on water and on snow and in the air, and when airborne, the rider can detach the tow rope and use the product as a glider. The toy disassembled, separates a wing section from a fuselage or tail section. The wing section is independently usable as a wakeboard; longitudinally extending fins which provide stability in movement of the assembled product in water and air and easier lift-off into the latter, also aid in control of the wakeboard in water and on snow. The fuselage or tail section is independently usable as a surfboard or water ski, wakeboard, snowboard or kneeboard. As a surfboard, it would be inverted so that thin vertical fins on the wider tail end of its upper surface when used as the fuselage, would extend into the water. Control elements exist on the appropriate surfaces of the sections to enable rider steerage of the sections and/or assembled product.

12 Claims, 3 Drawing Sheets

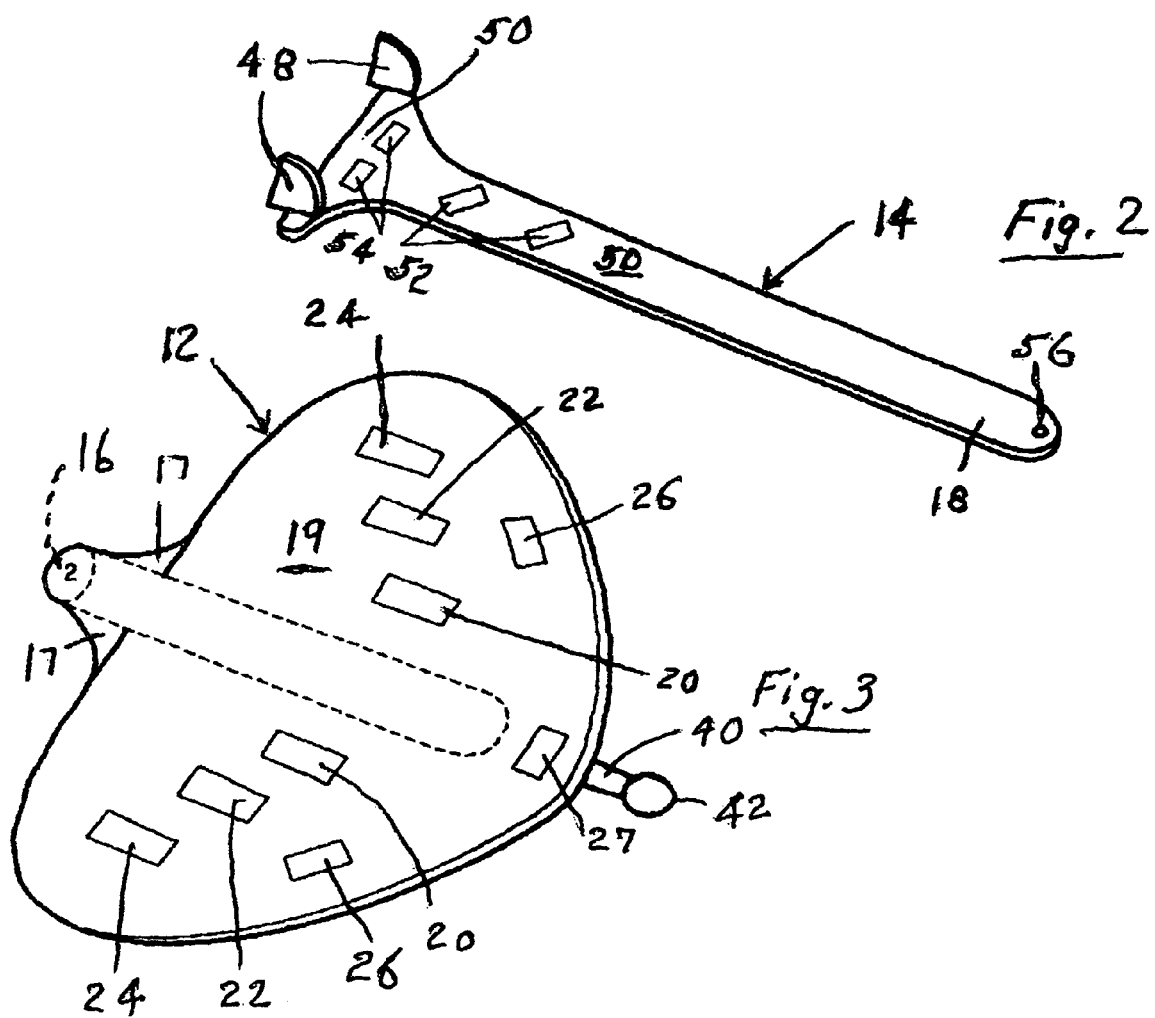

UNIVERSAL FLYING HAWK

BENEFIT OF EARLIER APPLICATION

This is a continuation-in-part application claiming the benefit of the earlier filing date of prior filed nonprovisional application Ser. No. 09/313,566 filed May 14, 1999 now abandoned by Douglas D. DeMasi for "Universal Flying Hawk".

This application will utilize, and incorporate by reference, the file jacket and contents of the prior application, including the specification, drawings and path or declaration from the prior application, to constitute part of the new application.

FIELD OF THE INVENTION

This invention relates to recreational products, and more particularly to a recreational product which can be used on water and snow and in the air.

BACKGROUND OF THE INVENTION

Recreational products for towing in water behind power boats are well known. Recreational products for towing in air behind power boats are also known. Recreational products for towing in water and in air behind power boats are not known.

Recreational products are frequently inflatable; inflatable recreational products all have one thing in common—you either use a pump to blow them up or your mouth to blow them up. And they usually have separate chambers for air. This helps with the configuration of whatever sports toy you like: they go through and skim across the water. The rider stays on it by holding onto the hand grips or the leg or ankle grips or using foot handles.

Many existing recreational products, whether inflatable or otherwise, are not aerodynamic in a practical way, shape or form. While they may be drawn across the water at a high or very dangerous high rate of speed, they can't be controlled well by the rider and therefore are dangerous.

What is not known is a safe recreational product which can not only be used for towing in water but can also used for towing in air behind the same power boat. Nor is known such a safe recreational product which can be disassembled into several separate water toys.

PRIOR ART

The prior art includes the following patents:

| Number | Inventor | Comments |
| --- | --- | --- |
| 5,083,955 | Echols | Tow Rope handle (13) |
| 5,006,087 | Peterson | Towable, inflatable water sled with hand holds |
| 4,998,494 | Deutsch | Inflatable hull with pocket for sailboard with fin |
| 4,807,554 | Chi-Hung | Towed, inflatable boat with hand holds |
| 4,756,700 | Coleman | Float (44) |
| 4,450,784 | Mellinger | Flying Boat |
| 2,958,875 | McClain | Towed water sled with fin, foot holds and rearward projections (18, 19) |
| 1,843,617 | Marshall | Swimming board |
| D 306,631 | Aguilar | Towed watercraft |
| D 199,470 | Ziff | Surfboard |
| D 133,078 | Lee | Surfboard |
| WO92/11,181 | Scicluna | Surfing board of two elements |

SUMMARY OF THE INVENTION

Accordingly, it is an object of the invention to provide a recreational product which can not only be used for towing in water but can also used for towing in air behind the same power boat.

A more specific object of the invention is to provide a recreational product that can be towed by a power boat on the water, and can thereafter gotten airborne and kept airborne with complete control by the rider.

Another object of the invention is to provide such an airborne product that can be easily controlled by the person thereon simply by shifting the person's weight to one side or the other (left or right), and/or forward or backward (up or down).

A related object is to provide such an airborne product that is truly like a bird and flies through the wind with the greatest of ease.

A further related object is to provide such an airborne product that is easily mounted and dismounted by the rider.

A still further related object is to provide such an airborne product that is the safest towed water-related recreational product.

A further object of the invention is to provide such an airborne product that has a detachable portion that can be used to surf as a surfboard or one ski behind a power boat.

A still another object of the invention is to provide an airborne product whose wing-like portion can also be used as a wakeboard or rideable element going through the water or riding the ocean or lake waves or down rivers.

Yet another object of the invention is to provide a detachable portion which comes out very easily from a socket in the wing-like portion and that is very easy to put back together with the rest of the product.

A still further object of the invention is to provide such a recreational product that can also be used in the snow.

A yet further object of the invention is provide such a recreational product which is easy to transport and compactable for storage.

The objects of the invention are achieved by providing a recreational product that has the wing span of a hawk and the tail control of a hawk. The wing span of a hawk is achieved by the provision of a laterally extending wing-like body; stabilizing and control of the wing-like body on water and in the air is provided by longitudinally extending fins on the bottom of the wing-like body. The tail control of a hawk is achieved by the rigid coupling of a surfboard-like fuselage or tail section to the rear of the wing-like body; stabilizing and control of the recreational product in the air is aided by reversible, longitudinally extending fins on top of the rear of the coupled surfboard-like fuselage. Full control is achieved by the rider thereof through control elements by appropriate weight shifts to one side or the other and forwards or backwards (left or right, up or down). A tow hook on the front end of the wing-like body enables pulling of the recreational product on water, and through the air if the speed of the towing or power boat is high enough and the rider of the product so wills and controls it.

Once airborne, the recreational product may be used as a glider. This simply entails the rider disconnecting the tow rope and stabilizing and controlling the recreational product accordingly.

When the recreational product has been disassembled by disconnecting the wing-like body from the fuselage, the disassembled portions may be used as a wakeboard. As a wakeboard, the portion may be pulled through the water via the tow hook on its front end or indirectly through the rider holding a tow bar in his hands.

A disconnected fuselage, when inverted to place its fins below, may be used as a surfboard; the fins may be reversed to improve the surfboard action. The surfboard may be used in conventional fashion to ride the ocean waves or going down rivers, or it may be towed via a hook hole on its front end. The hook hole may also be part of the mechanism for coupling the fuselage and the wing-like body together. The mechanism may include a snap hook releasable by a movable control element or hand strap.

A unique feature of the invention is that three toys are readily available in one recreational product. Assembled, there is a toy which can be pulled through water and through the air, and in the later case even function as a glider; it can even be used as a snow toy. Disassembled, the front or wing-like body may be used as a wakeboard or rideable element; the surfboard-like fuselage or tail section may be used as a rideable element, e.g. a wakeboard or a surfboard in conventional fashion or towed.

An advantage of the invention is that both the wing-like body and the surfboard-like fuselage or tail section may be made of inflatable materials that lend themselves to minimum storage and transportation requirements. The inflatable materials provide especially good flotation materials usable n the event of mishap, for safety purposes.

Another advantage of the invention is that it increases the rider's mind power. It increases his reflexes. It helps his coordination (eye/hand/mind). It does this by enabling control by the rider and thus requires him to actually think about his actions.

A further advantage of the invention is that when used airborne, it helps the rider to overcome any fear of heights. Thus the rider, and any passenger, feel true freedom through the air—simply flying through the air with the greatest of ease and with unbelievable control because of the design features of tail, fuselage, fins on the bottom of the wing, the configuration of the wing, the span of the wing, and the design of the wing. The rider can truly feel in control of his own destiny. And if he ever wants to release for any reason whatsoever, from the power boat that is pulling him or them, he or she simply releases the tow rope clip and glides down to the water very easily and very safely.

BRIEF DESCRIPTION OF THE DRAWINGS OF A PREFERRED EMBODIMENT OF THE INVENTION

These and other objects, features and advantages of the invention will become apparent from a reading of the following description of a preferred embodiment of the invention, when considered with the accompanying drawings wherein:

FIG. 2 is a diagrammatic view in perspective of the top of the surfboard-like fuselage or tail section detached from the wing-like body of the recreational product of FIG. 1;

FIG. 3 is a diagrammatic view in perspective of the top of the wing-like body detached from the surfboard-like fuselage or tail section of the recreational product of FIG. 1;

DETAILED DESCRIPTION OF A PREFERRED EMBODIMENT OF THE INVENTION

Figure 1:
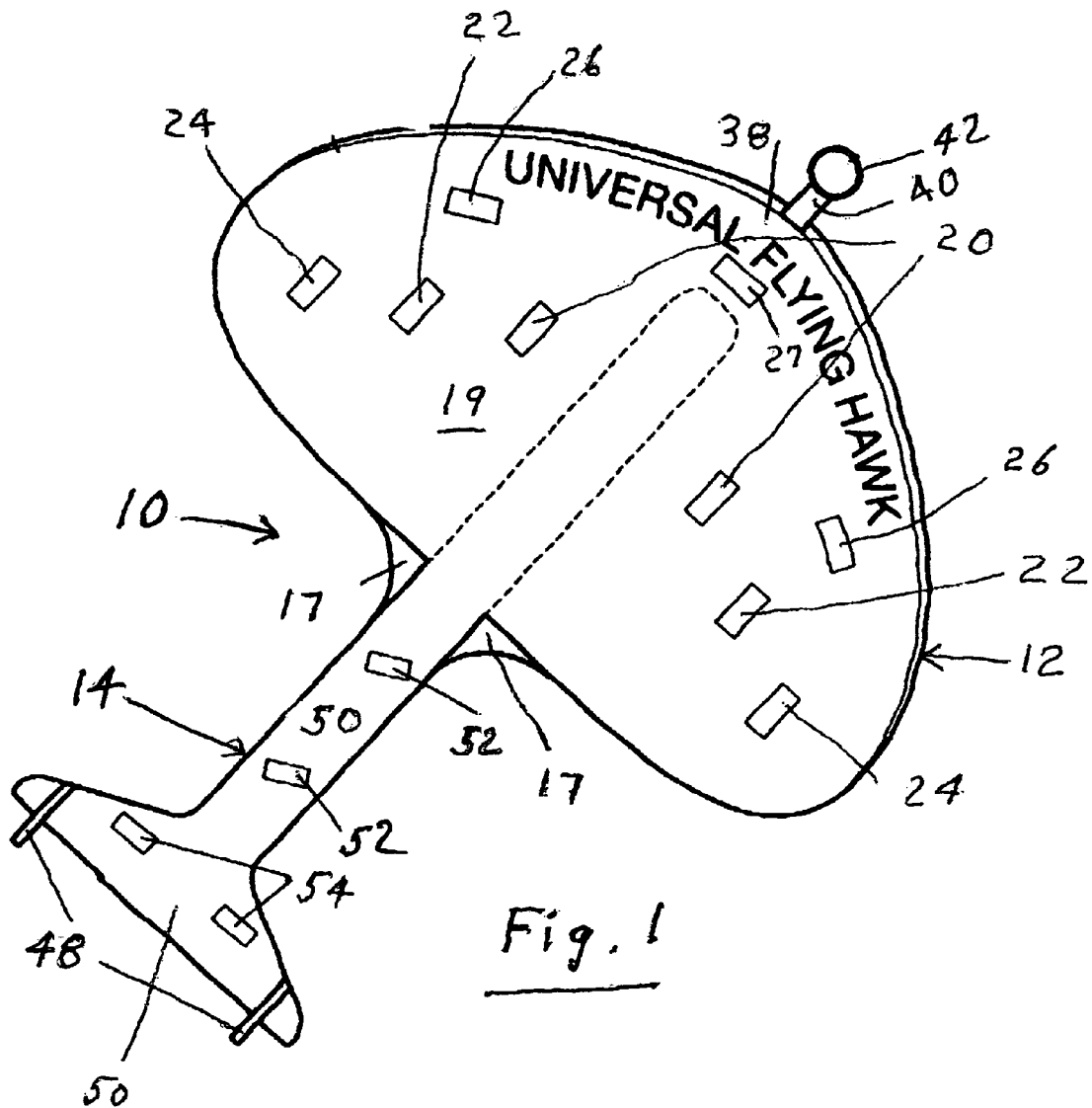
FIG. 1 is a top diagrammatic view of an assembled recreational product according to the invention.

Referring now more particularly to the drawings, there is shown in FIG. 1 an inflatable recreational product generally indicated by the numeral 10. The product 10 includes a wing-like body or section or portion or wing generally indicated by the numeral 12, and a surfboard-like fuselage or tail section or portion generally indicated by numeral 14. A rearward facing opening or socket 16 (FIG. 2) in the center of the rear end of the wing-like body or wing 12 receives the forward end 18 of the fuselage or tail section 14 in the assembled recreational product 10. The opening 16 and front end 18 may be complementary but non-circular in cross-section, to aid in preventing rotational movement between the two parts. Suitable straps and/or VELCRO, including brace elements 17 extending rearward about the opening 16 from the rearward edge of the wing-body, are in place to hold the parts 12 and 14 together with the front end 18 of the fuselage 14 in the wing-like body opening 16. The inner end of the opening or socket 16 may incorporate a snap hook for engagement with the fuselage front-end hole 56 to help secure the two parts together. The snap hook may be releasable by making the hand strap 27 first rotatable and then vertically movable, and employing a suitable mechanism there between.

As best seen in FIGS. 1 and 3, the wing-like body 12 on its upper surface (which is non-slip) carries, as rider control elements, inner and central, a set of conventional foot and hand straps 20; somewhat further spaced apart and more rearward, a set of conventional foot and hand straps 22; and outside and rear, a set of conventional foot and hand straps 24. An extra set of conventional foot and hand straps 26 may be forward of the hand straps 22. The straps are foot straps for standing control, whether being towed, or surfing or skiing, and may include extended hand straps for standing stability while being towed; they are hand straps for lying down control. The multiple sets of foot and hand straps accommodate different sized riders, and one or more riders; when lying down, changing hand straps facilitates weight redistribution for control purposes, both on water and snow and in the air. Alternatively, the non-slip surface could be a VELCRO component, and the other VELCRO component could be used on the bottom of shoes or on the outer and gripping side of gloves in lieu of the straps.

A forward central control element or hand strap 27 is also provided for holding onto when the rider is lying on the product in a stretched-out or straight condition.

The upper surface 19 is the outside of a tough layer of a suitable plastic separated from the bottom layer of a suitable plastic by a set of inflatable pockets in conventional manner. The upper surface layer and the bottom layer constitute a rugged protective shell for the inflatable pockets formed by inner air bladders.

Of course, the wing-like body 12 and surfboard-like fuselage or tail section 14 my also be made from fiberglass, wood, anodiamic, heavy duty PVC, polyester or other synthetic materials. If desired, a bi-or tri-wing design may be built, so that airborneness can be had at lower speeds.

Figure 4:
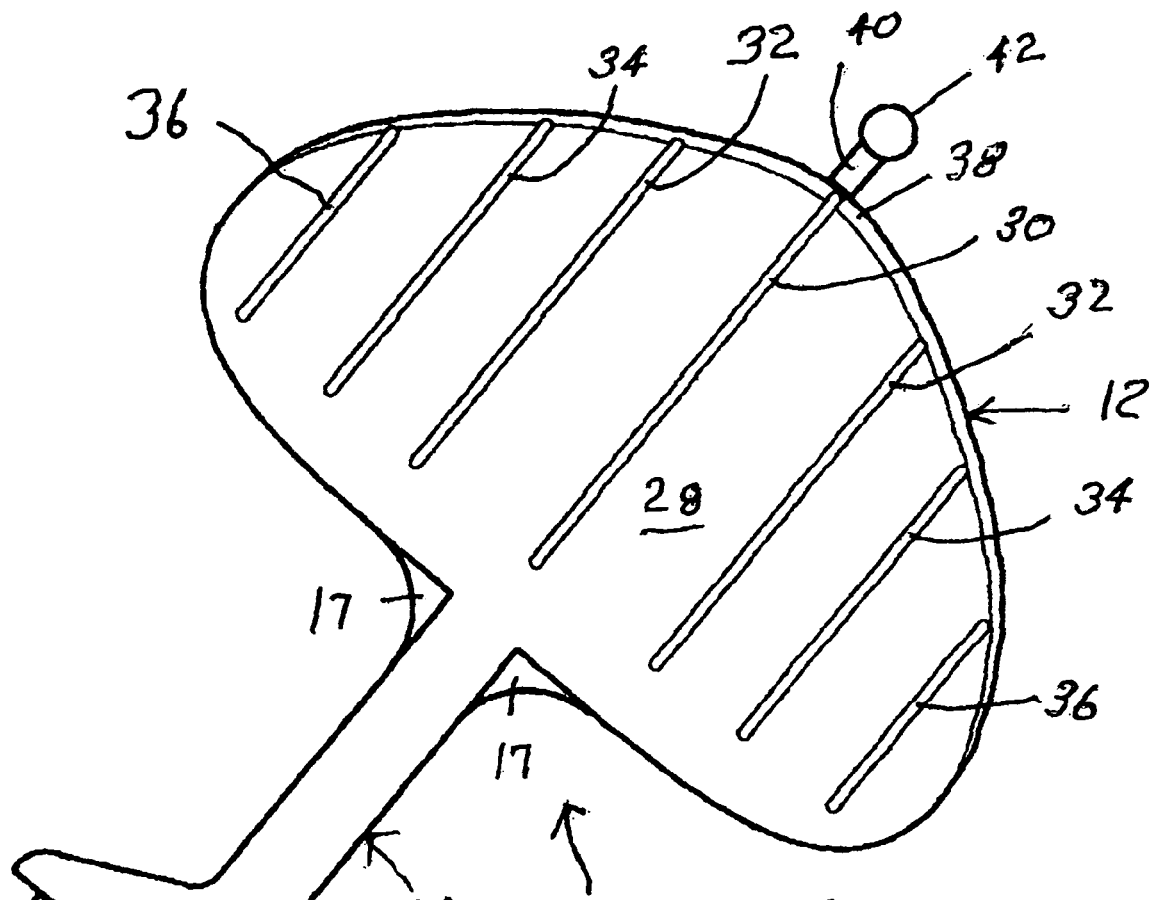
FIG. 4 is a diagrammatic view of the underside of the assembled recreational product of FIG. 1.

As best seen in FIG. 4, the wing-like body 12 on its lower surface 28 (which is smooth and the outside of the lower layer) carries a set of longitudinally-extending bottom fins to stabilize the wing-body when in motion and help control in rugged or slow turns when cutting through the water or snow and through the air. The central and longest fin 30 assures even pressure on both sides of the wing-like body 12 when being pulled by a motor boat; it provides even pressure through-out the body and prevents damage by ripping apart. A bottom fin 32 to each side of the central fin 30 adds to the control in water, snow and air. But the primary control in water, snow and air resides in a set of fins 34 outside of the fins 32. And a set of wing fins 36 outside the primary fins 34 provide for added lift and control when getting airborne.

Figure 5:
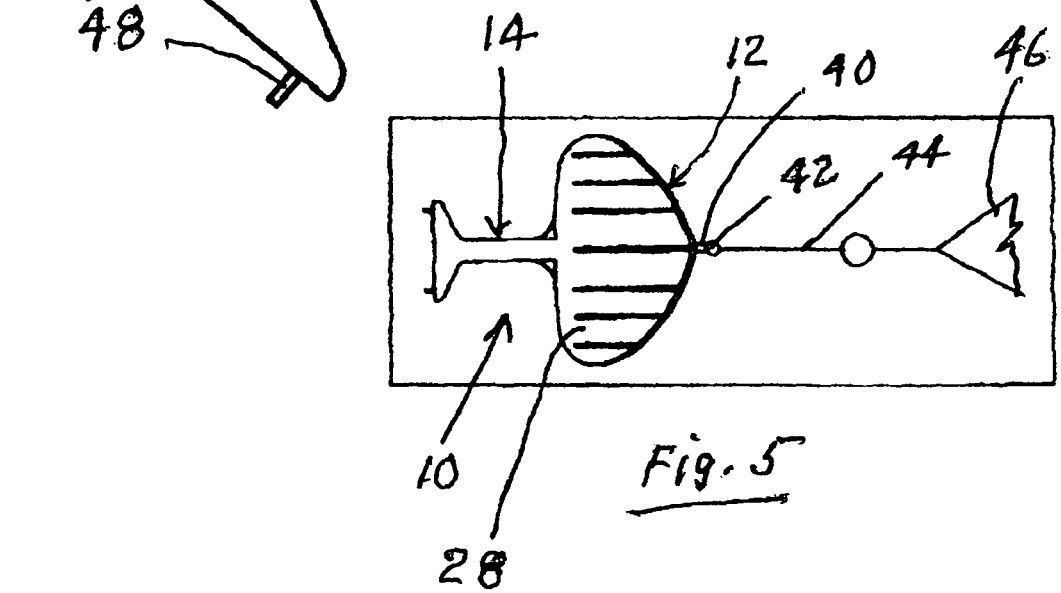
FIG. 5 is a reduced diagrammatic view of the underside of the assembled recreational product shown in FIG. 4, and a diagrammatic view of a floatable tow line and tow hook and power boat for the product.

The central front end 38 of the wing-body mounts via a strap 40 from the bottom of the lower layer surface 28, a tow hook 42. The tow hook strap 40 is heat welded or sewn-in the bottom surface 28 and secures the tow hook or ring 42 in conventional manner for attachment of the tow clip at the end of a floating tow line 44 pulled by a boat 46 (FIG. 5). The central location of the tow hook 42 provides even pulling pressure on the product 10.

As best seen in FIG. 2, the detachable surfboard-like fuselage or tail section generally indicated by numeral 14, is in upside-down condition from when it is functioning as a surfboard. When attached to the wing-like body 12 to form the universal flying hawk, longitudinally-extending tail fins 48 (FIG. 2) on a laterally extending tail 50 of the fuselage or tail section, are upright with their leading edges curved. They may also be upright when the detached section is used as a water ski, wakeboard, snowboard or kneeboard. They would normally be downward when the detached section is used as a surfboard The fundamental structure of the surfboard-like fuselage or tail section is basically that of a conventional inner bladder of one or more compartments covered by an outer protective shell. The upper surface 50 (FIGS. 1 and 2) of the protective shell is a non-slip surface (that is, non-slippery when wet to ordinary human-applied pressures). The non-slip surface 50 bears rider control elements such as foot straps 52 constituting the normal water-ski straps, and ankle and leg straps 54 for lying-down rider positions on the assembled recreational product. The front end 18 of the fuselage may be formed with a hole 56 for towing as a board.

To use the product, the product and its parts could be transported to a lake, stream or ocean, in non-inflated condition. On arrival, they would be inflated in conventional fashion. The two parts could then be assembled, the front end 18 of the fuselage 14 being inserted into the opening or socket 16 of the wing-like body 12 and secured in place by suitable straps and/or VELCRO and snap hook. The recreational product 10 could then be placed in water and the tow line 44, floating behind the idling boat 46, attached to its tow ring 42; and rider mounted, suitable access being made to the appropriate control elements for the position assumed. The boat driver, after being instructed on the desired activity, whether water only or water and airborne action, would then be signaled to take up any rope slack and proceed properly for the desired activity. The rider would control the action of the recreational product through interaction via one or more of the control element straps 20, 22, 24, 26, 27, 52, and 54, depending on whether he or she was standing, sitting, lying down or kneeling. If the boat 46 is speeded up to where the recreational product became airborne, the product remains airborne until either the boat speed is reduced or the tow cable 44 is uncoupled by the rider and the product descends in glider fashion. In a strong wind, the product can also be used as a kite.

Steering on water is accomplished by shifting your weight right or left: shifting the weight right results in right turns; shifting the weight left results in left turns. When the speed is sufficient, shifting the weight backwards will cause the product to become airborne. Keeping the weight back will cause the product to reach its maximum altitude, considering the tether and speed and wind conditions. To return to the water, either the weight is shifted forward, or the power boat 46 is slowed down.

In use as a disassembled recreational product, either or both of the wing-like body 12 and the fuselage or tail section 14 may be used. The wing-like section 12 may be put to use as a wakeboard or surfboard or water ski being towed by the boat 46. The fuselage or tail section 14 may be used as a water ski or wakeboard, or inverted and used as a surfboard with the fins 48 being reversed to present their vertical edges forward.

If the product was made of inflatable materials, it would be deflated after use for transportation and storage conveniences.

While applicant has shown and described a preferred embodiment of the invention, it will be apparent to those skilled in the art that other and different applications may be made may be made of the principles of the invention, and that therefore the invention should not be construed as limited to the specific application shown and described but instead broadly appreciated as set forth in the following claims.

The invention claimed is:

1. A rider recreational product having a wing section and a fuselage or tail section for skimming on water and flying through the air aerodynamically and separable along a common horizontal plane into two sections, comprising a first section constituting the wing of the product and deriving its lift in flight from the reaction forces resulting from its motion through air and independently usable as a rideable element, and a second section constituting the fuselage or tail section of the product and independently usable as a surfboard or ski.

2. A recreational product according to claim 1, wherein the wing section has control elements on its upper surface for engagement by the rider.

3. A recreational product according to claim 1, wherein the tail section has control elements on its upper surface for engagement by the rider.

4. A recreational product according to claim 1, wherein the wing section has longitudinally extending fins on its underside for facilitating control of the product when in motion.

5. A recreational product according to claim 4, wherein the tail section has longitudinally extending fins on its upper side for facilitating control of the product when in motion.

6. A recreational product according to claim 5, wherein both the wing section and the tail section also have control elements on their upper surfaces for engagement by the rider.

7. A recreational product according to claim 1 wherein the tail section has longitudinally extending fins on its upper side for facilitating control of the product when in motion.

8. A rider recreational product having a wing and a fuselage or tail section for skimming on water and flying through the air aerodynamically and separable along a common horizontal plane into two sections, comprising a first section constituting the wing of the product when the wing section is attached to the recreational product and deriving its lift in flight from the reaction forces resulting from its motion through air and independently usable as a rideable element, and a second section constituting the fuselage or tail section of the product and independently usable as a surfboard or ski, the first section having longitudinally-extending control fins on its underside for withstanding rugged or slow turns in water and air.

9. A rider recreational product for skimming on water and flying through the air and separable into two sections according to claim 8, wherein the first section has a front end, and a tow hook secured to the front end of the first section.

10. A rider recreational product for skimming on water and flying through the air and separable into two sections according to claim 8, wherein both the wing section and the tail section have control elements on their upper surfaces for engagement by the rider.

11. A rider recreational product for skimming on water and flying through air and separable into two sections according to claim 8, wherein there is a central longitudinal fin on the underside of the first section to insure even pressure throughout the first section when in motion.

12. A rider recreational product for skimming on water and flying through air and separable into two sections according to claim 11, wherein there are longitudinally-extending fins at the outer edges of the first section for added lift and control.

* * * * *